(12) United States Patent
Cody et al.

(10) Patent No.: US 7,277,614 B2
(45) Date of Patent: Oct. 2, 2007

(54) TETHER ASSEMBLY HAVING INDIVIDUAL CONNECTOR PORTS

(75) Inventors: Joseph T. Cody, Hickory, NC (US); Otto I. Szentesi, Hickory, NC (US); Martin J. Curran, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 184 days.

(21) Appl. No.: 11/003,102

(22) Filed: Dec. 3, 2004

(65) Prior Publication Data

US 2006/0120672 A1    Jun. 8, 2006

(51) Int. Cl.
G02B 6/44    (2006.01)

(52) U.S. Cl. .................. 385/100; 385/102; 385/106; 385/109; 385/112

(58) Field of Classification Search ......... 385/100–114
See application file for complete search history.

(56) References Cited

U.S. PATENT DOCUMENTS

| | | | |
|---|---|---|---|
| 4,884,863 A | 12/1989 | Throckmorton | 350/96.2 |
| 4,961,623 A | 10/1990 | Midkiff et al. | 350/96.2 |
| 5,004,315 A | 4/1991 | Miyazaki | 350/96.15 |
| 5,042,901 A | 8/1991 | Merriken et al. | 385/135 |
| 5,121,458 A | 6/1992 | Nilsson et al. | 385/100 |
| 5,125,060 A | 6/1992 | Edmundson | 385/100 |
| 5,210,812 A | 5/1993 | Nilsson et al. | 385/100 |
| 5,440,665 A | 8/1995 | Ray et al. | 385/135 |
| 5,528,718 A | 6/1996 | Ray et al. | 385/136 |
| 5,657,413 A | 8/1997 | Ray et al. | 385/139 |
| 5,778,122 A | 7/1998 | Giebel et al. | 385/55 |
| 5,892,870 A | 4/1999 | Fingler et al. | 385/59 |
| RE36,592 E * | 2/2000 | Giebel et al. | 385/100 |
| RE37,028 E | 1/2001 | Cooke et al. | 385/112 |

(Continued)

FOREIGN PATENT DOCUMENTS

DE    3537684    4/1987

(Continued)

OTHER PUBLICATIONS

Tyco Electronics Raychem Product Sheet, FITS FOSC—Factory Installed Termination System for Fiber Optic Cable Splices, 1999, 2 pages.

Primary Examiner—Frank G. Font
Assistant Examiner—Derek L. Dupuis
(74) Attorney, Agent, or Firm—Jeffrey S. Bernard

(57) ABSTRACT

A tether assembly includes a tether cable containing optical fibers and adapted to be attached to a fiber optic distribution cable at a mid-span access location. A furcation at the end of the tether cable separates and transitions the optical fibers into furcation legs terminating in individual connector ports. Each connector port may be a receptacle for receiving a connector mounted upon one of the optical fibers and a mating connector of a drop cable, a plug mounted upon one of the optical fibers that is received within a plug alignment member operable to align the plug with a mating plug of a drop cable, or a connector that is routed to a receptacle disposed within an external wall of a network connection terminal from within the enclosure. The tether assembly provides a distribution cable assembly and method for mitigating a span length measurement difference in a pre-engineered communications network.

18 Claims, 11 Drawing Sheets

U.S. PATENT DOCUMENTS

| | | | |
|---|---|---|---|
| 6,466,725 B2 | 10/2002 | Battey et al. | 385/135 |
| 6,619,697 B2 | 9/2003 | Griffioen et al. | 285/126.1 |
| 6,621,975 B2 | 9/2003 | Laporte et al. | 385/135 |
| 2004/0223720 A1 | 11/2004 | Melton et al. | 385/147 |
| 2005/0111800 A1* | 5/2005 | Cooke et al. | 385/100 |
| 2005/0259928 A1* | 11/2005 | Elkins et al. | 385/100 |
| 2005/0265672 A1* | 12/2005 | Theuerkorn et al. | 385/100 |

FOREIGN PATENT DOCUMENTS

| | | |
|---|---|---|
| EP | 0520946 A1 | 6/1992 |
| EP | 0592287 B1 | 10/1993 |
| JP | 58-105114 | 6/1983 |
| JP | 60-169813 | 3/1985 |
| JP | 60-169813 | 9/1985 |
| JP | 60-169815 | 9/1985 |
| JP | 60169813 A * | 9/1985 |
| JP | 61-27510 | 2/1986 |
| JP | 61-190305 | 8/1986 |
| JP | 61-220536 | 9/1986 |
| JP | 62-054204 | 3/1987 |
| JP | 62-59906 | 3/1987 |
| JP | 63-136007 | 6/1988 |
| JP | 63-180915 | 7/1988 |
| JP | 63-287916 | 11/1988 |
| JP | 63-310317 | 12/1988 |
| JP | 1-138828 | 5/1989 |
| JP | 01138828 A * | 5/1989 |
| JP | 2001-116968 | 4/2001 |
| JP | 2001116968 | 4/2001 |

* cited by examiner

TETHER ASSEMBLY HAVING INDIVIDUAL CONNECTOR PORTS

BACKGROUND OF THE INVENTION

1. Field of the Invention

The present invention relates generally to a tether assembly for a fiber optic communications network and, more particularly, to a tether assembly including a first end adapted for interconnection with a fiber optic distribution cable and a second end terminating in one or more individual connector ports, wherein each connector port provides access to at least one optical fiber interconnected with at least one optical fiber of the distribution cable.

2. Description of the Related Art

Optical fiber is increasingly being used for a variety of broadband communications including voice, video and data transmissions. As a result of the ever increasing demand for broadband communications, fiber optic networks typically include a large number of mid-span access locations at which one or more optical fibers are terminated from a distribution cable and interconnected with another fiber optic cable, such as a branch cable or a drop cable. The mid-span access locations provide an interconnection point, also referred to herein as a "tap" point, from the distribution cable leading to a network distribution terminal, or from the distribution cable leading directly to an end user, commonly referred to as a subscriber, thereby extending an "all optical" communications network closer to the subscriber. In this regard, fiber optic networks are being developed that deliver "fiber-to-the-curb" (FTTC), "fiber-to-the-business" (FTTB), "fiber-to-the-home" (FTTH), or "fiber-to-the-premises" (FTTP), referred to generically as "FTTx."

In one example of a fiber optic communications network, one or more drop cables are interconnected with a distribution cable at a mid-span access location. Substantial expertise and experience are required to configure the optical connections in the field. In particular, it is often difficult to identify a particular optical fiber of the distribution cable to be optically connected with an optical fiber of a drop cable. Once identified, the optical fiber of the distribution cable is typically joined directly to the optical fiber of the drop cable at the mid-span access location using conventional splicing techniques, such as fusion splicing. In other instances, the optical fiber of the distribution cable and the optical fiber of the drop cable are each first spliced to a short length of optical fiber having an optical connector mounted on the other end, which is generally referred to in the art as a "pigtail." The pigtails are then routed to opposite sides of an adapter or connector alignment sleeve to align and interconnect the drop cable with the distribution cable. In either case, the process of configuring the mid-span access location is not only time consuming, but frequently must be accomplished by a highly skilled field technician at significant cost and under field working conditions that are less than ideal. In situations in which a mid-span access location is enclosed within a conventional splice closure, reconfiguring optical connections within the splice closure is especially difficult, based in part on the relatively inaccessible location of the closure, the limited workspace available within the closure, and the inability to readily remove the closure from the distribution cable. Further, once the optical connections are spliced, it is labor intensive, and therefore relatively costly, to reconfigure the optical connections or to add additional optical connections.

In order to reduce installation costs by permitting less experienced and less skilled technicians to make optical connections and to reconfigure optical connections at mid-span access locations in the field, communications service providers are increasingly pre-engineering new fiber optic networks and demanding factory-prepared interconnection solutions, commonly referred to as "plug-and-play" type systems. There are currently several methods to build a distribution cable assembly for economical deployment and field installation. In one example, the distances between desired network interconnection locations (i.e., tap points) are measured with great accuracy and a distribution cable is assembled in the factory with mid-span access locations positioned precisely at the desired tap points. However, in this instance the length of the distribution cable between mid-span access locations must be exact, and the deployment of the distribution cable must be performed accurately so that each tap point is positioned at the predetermined location. If the length of the span of distribution cable between adjacent mid-span access locations is short, or if the position of even one tap point is incorrect, the error could have a compounding effect on the position of each downstream mid-span access location. As a result, all downstream mid-span access locations will be positioned upstream of their intended location and the distribution cable will not extend to the end of the cable run.

Obviously, measuring the required distances between mid-span access locations and assembling a distribution cable with accurate distances between mid-span access locations is a difficult undertaking. Furthermore, an error in the manufacturing process may result in the entire distribution cable assembly being unusable, and therefore scrapped. Alternatively, an excess length of cable (i.e., cable slack) may be intentionally built into the distribution cable at each mid-span access location to insure that the tap point can always be positioned in the field at precisely the predetermined location. The obvious drawbacks with such a distribution cable assembly are the cost associated with the excess lengths of the cable and the associated need to store the cable slack in a practical yet aesthetic manner.

In addition to the difficulties associated with manufacturing a distribution cable assembly having the mid-span access locations in the pre-engineered locations, there are also problems encountered with using conventional components to optically connect the optical fibers of the distribution cable with optical fibers of a branch cable or drop cable at the tap points. For example, rigid enclosures are typically used to protect the section of the distribution cable that must be exposed to access the appropriate optical fibers and to house the spliced optical connections. Distribution cables provided with conventional enclosures tend to be large in size and relatively inflexible. As a result, the distribution cable is unable to satisfy common shipping and deployment constraints, such as being wound onto a reel and deployed through conduits having a relatively small inner diameter or significant bends, or deployed through conventional aerial lashing equipment, such as sheaves and rollers. Furthermore, such enclosures are often structurally complex and difficult to install.

Several alternatives have been proposed to overcome the disadvantages of rigid enclosures, while at the same time providing a practical solution for mitigating span length differences that arise as a result of a span length measurement, cable manufacturing or cable deployment error. In one alternative, a tether assembly adapted for interconnection with a distribution cable includes a tether cable terminating in a relatively flexile optical connection terminal having one or more connector ports. Each connector port typically includes a receptacle for readily connecting an optical fiber of a connectorized fiber optic branch cable or drop cable to an optical fiber of the distribution cable. Although a tether assembly including an optical connection terminal provides convenient access to the terminated optical fibers of the distribution cable and mitigates span length differences, several disadvantages remain. For instance, while the optical connection terminal is generally smaller than a conventional field-installed enclosure, installation limitations may still exist based on the size and profile of the terminal. This is particularly so when a large number of optical fibers must be terminated at a mid-span access location, thus requiring an optical connection terminal having a greater number of connector ports, such as eight or twelve. In addition, a unitary optical connection terminal does not allow access to a particular connector port without disturbing the remaining connector ports and any previous optical connections. This is particularly important in a vault, hand-hole or pedestal installation where it would be convenient and advantageous to access a particular connector port without having to remove the entire optical connection terminal from the enclosure or to reposition the terminal within the enclosure to access the desired connector port. Because of the location of the optical connection terminal or the number of drop cables previously connected to other connector ports, it may be difficult to remove or reposition the terminal within the enclosure. Still further, a unitary optical connection terminal is typically more difficult to seal because of the size and shape needed to accommodate a plurality of connector ports.

Accordingly, there is a specific and unresolved need for a tether assembly adapted for interconnection with a distribution cable in a fiber optic communications network that overcomes the specific disadvantages described above. For example, a tether assembly is needed that provides convenient and ready access to the terminated optical fibers of the distribution cable, while mitigating any difference between a pre-engineered span length measurement and the actual span length following deployment of the distribution cable that may arise as a result of a network measurement, cable assembly manufacturing, or cable deployment error. What is also needed is a factory-prepared tether assembly having a plurality of connector ports that provides access to an individual connector port without disturbing the remaining connector ports. In a particular embodiment, a factory-prepared fiber optic distribution cable preferably includes a tether assembly having an upstream end adapted for connection to terminated optical fibers of the distribution cable and a downstream end terminating in a plurality of individual connector ports, wherein each connector port provides access to at least one optical fiber interconnected with at least one of the terminated optical fibers of the distribution cable. Such a fiber optic distribution cable assembly would not require a highly-skilled field technician or extensive field labor to interconnect an optical fiber of the distribution cable with an optical fiber of a branch cable or drop cable at a tap point in a pre-engineered fiber optic communications network.

BRIEF SUMMARY OF THE INVENTION

To achieve the foregoing and other objects and advantages, and in accordance with the purposes of the invention as embodied and broadly described herein, the present invention provides various embodiments of a tether assembly including a first end adapted to be optically connected to terminated optical fibers of a fiber optic distribution cable at a mid-span access location and a second end terminating in one or more individual connector ports, wherein each connector port provides access to at least one optical fiber interconnected with at least one of the terminated optical fibers of the distribution cable. In various embodiments, each connector port comprises an optical connector disposed within a rugged housing, such as a plug or a receptacle, suitable for use in an outdoor environment. The optical connector of the connector port and the optical connector of a connectorized branch cable or drop cable may be received within an adapter or connector alignment sleeve operable for aligning the optical fibers of the respective connectors. In particular embodiments, the tether assembly includes a tether cable having a preselected length and one or more individual connector ports attached to the tether cable that permit a tap point to be accurately positioned at a desired location in a fiber optic communications network, while permitting each connector port to be accessed individually without disturbing the remaining connector ports.

In another exemplary embodiment, the present invention provides a factory-prepared mid-span access location and tether assembly including a furcation plug adapted to be secured to an exterior wall of a network connection terminal. The tether assembly terminates in a plurality of individual connectors that are routed to one or more connector ports disposed within an exterior wall of the same network connection terminal. In preferred embodiments, each connector port is configured with a receptacle operable for receiving the individual connectors from the inside of the terminal and connectorized drop cables from the outside of the terminal. The receptacle may include an adapter or connector alignment sleeve for aligning the optical fibers of the opposing connectors. In embodiments in which the individual connectors are received within a network connection terminal, sealing and cabling requirements may be less stringent than other embodiments in which individual connector ports are routed and stored unprotected within a vault, hand-hole or pedestal.

In further embodiments, the present invention provides a fiber optic distribution cable assembly having at least one, and preferably a plurality of, predetermined mid-span access locations that serve as "tether attach points," and a corresponding plurality of tether assemblies that are attached to the respective mid-span access locations. Each tether assembly includes a tether cable having a first end that is attached to a respective mid-span access location in the factory and a second end terminating in a plurality of individual connector ports. The tether assembly is strapped or lashed to the distribution cable during shipping and deployment. When needed following deployment, the individual connector ports may be positioned at the desired tap point within the fiber optic communications network by moving the tether assembly along the length of the distribution cable, positioning the tether assembly away from the distribution cable, or routing the tether assembly to a network connection terminal to thereby mitigate any span length difference and provide a tap point at a desired location within the fiber optic communications network. In an alternative embodiment, a tether assembly comprising a tether cable and a plurality of individual connector ports may be manufactured in the factory and spliced or otherwise optically connected in the field to a previously installed fiber optic distribution cable at a mid-span access location.

The downstream end of the tether cable is furcated into a plurality of furcation legs each containing at least one optical fiber and the optical fibers of the furcation legs are connectorized. Each connector is then preferably received within a receptacle or plug for interconnecting an optical fiber of the tether cable with an optical fiber of a connectorized fiber optic cable, such as a branch cable or drop cable. The receptacle or plug may be configured to receive a variety of connector types, such as but not limited to SC, LC, DC, FC, ST, SC/DC, MT-RJ, MTP, MPO and other like single or multi-fiber ferrules now known or hereafter developed. Preferably, the tether cable has a preselected length up to about 100 feet, more preferably up to about 25 feet, and most preferably a length of about 12 to about 15 feet. However, the length of the tether cable may be customized in order to mitigate a particular span length difference without the need to accommodate a slack length of the tether cable. Preferably, the connector ports are provided on individual furcation legs of the tether cable having a length up to about 15 feet, and more preferably, between about 2 and about 10 feet. The individual furcation legs may have varying lengths, thus providing a plurality of staggered connector ports resulting in a reduced size and outer diameter profile to facilitate shipping, storage and deployment.

In yet another exemplary embodiment, the present invention provides a method of mitigating a span length difference in a pre-engineered fiber optic communications network comprising a fiber optic distribution cable assembly having at least one predetermined mid-span access location. The method comprises optically connecting one or more accessed and terminated optical fibers of the distribution cable to corresponding optical fibers of a tether cable attached to the distribution cable at the mid-span access location. The method further comprises providing a plurality of individual connector ports at a downstream end of the tether cable and positioning the individual connector ports at a desired location in the fiber optic communications network to compensate for the span length difference.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

Figure 1:
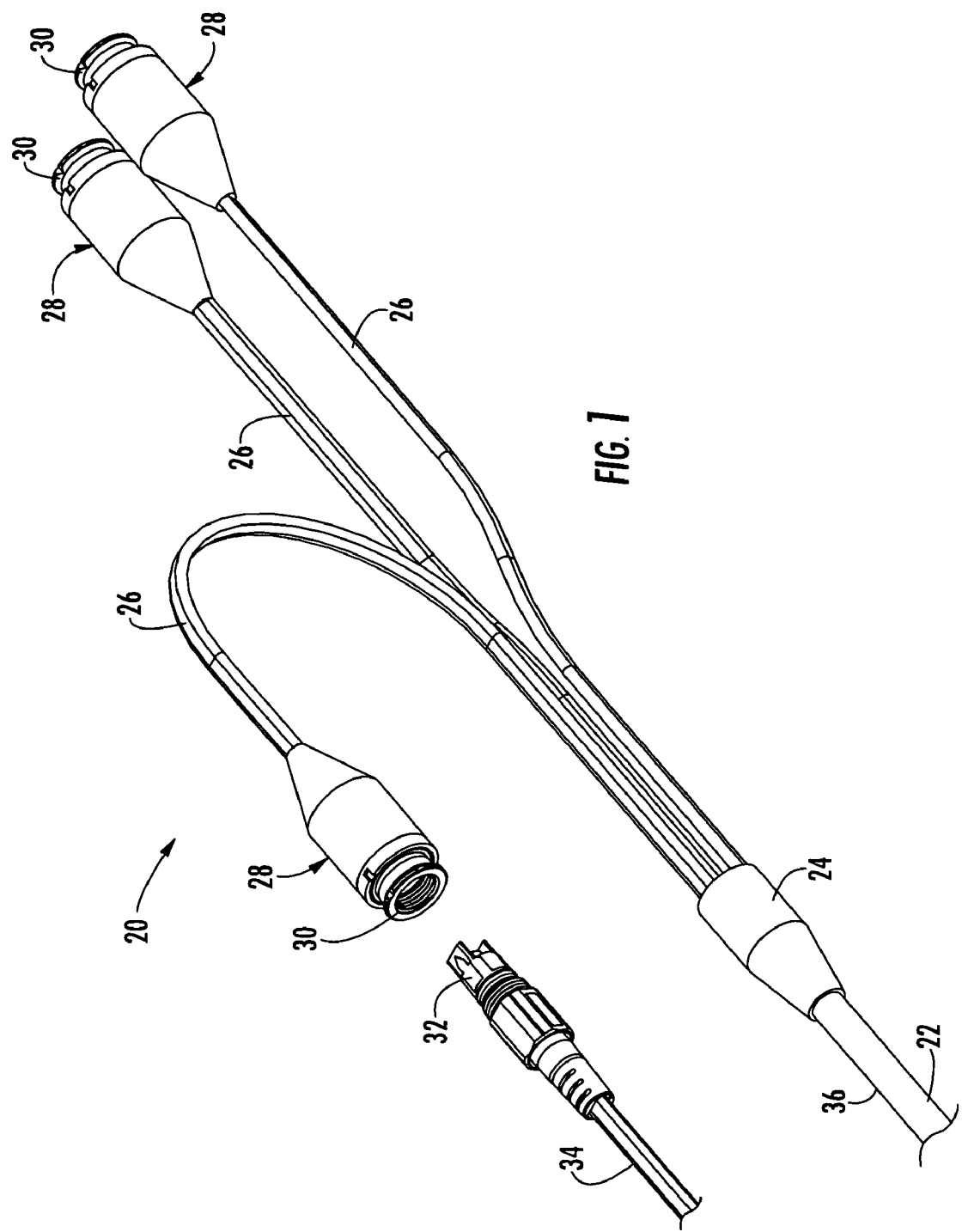
FIG. 1 is a perspective view of a tether assembly including a tether cable terminating in a plurality of individual connector ports comprising a receptacle for receiving a connectorized drop cable at a desired tap point in accordance with an exemplary embodiment of the present invention.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

The present invention provides various embodiments of a tether assembly for a fiber optic communications network comprising a tether cable having a first end adapted to be attached to a fiber optic distribution cable and a second end terminating in one or more individual connector ports, wherein each connector port provides access to at least one optical fiber interconnected with at least one optical fiber terminated from the distribution cable. The tether assembly is used to mitigate any span length difference that results from the improper positioning of a mid-span access location due to a span length measurement, cable manufacturing or cable deployment error in a pre-engineered fiber optic communications network following deployment of the distribution cable. The tether assembly is used to provide an interconnection point, also referred to herein as a "tap point," at a desired location along the length of the distribution cable or at another location away from a distribution cable, such as a telephone pole, vault, hand-hole, pedestal or network connection terminal. In all of the embodiments described herein, the tether assembly is attached to a fiber optic distribution cable at a mid-span access location along the length of the distribution cable and provides a preselected or customized length of tether cable that is used to correct the position of the mid-span access location or to extend the reach of the distribution cable and thereby position a tap point at a desired location in the fiber optic communications network to interconnect an optical fiber of the distribution cable with an optical fiber of a connectorized fiber optic cable, such as a branch cable or drop cable, referred to generically herein as a "drop cable."

In the exemplary embodiments shown and described herein, optical fibers accessed and terminated from a mid-span access location of the distribution cable are spliced or otherwise optically connected to optical fibers of the tether cable. The tether cable has a preselected or customized length preferably not exceeding about 100 feet, more preferably not exceeding about 25 feet, and most preferably between about 12 and about 15 feet. The remaining optical fibers of the distribution cable are managed and routed separately from the accessed and terminated optical fibers such that they extend uninterrupted through the distribution cable and are available for accessing and terminating at downstream mid-span access locations. In preferred embodiments, the distribution cable comprises a plurality of mid-span access locations at predetermined spaced-apart locations along the cable length, thus providing multiple access locations that serve as "tether attach points" for attaching the tether assembly to the distribution cable. The fiber optic distribution cable may be wound onto a reel for shipping and deployment through a conduit having a relatively small inner diameter or significant bends, or through conventional aerial lashing equipment, such as sheaves or rollers.

The distribution cable and the tether cable may present their respective optical fibers for interconnection with corresponding optical fibers in the fiber optic communications network in various configurations, including but not limited to, splice-ready optical fibers, connectorized optical fibers and pre-connectorized optical fibers positioned within a receptacle comprising alignment means, such as an adapter or connector alignment sleeve, or a plug. In one embodiment, one or more connectorized drop cables are routed to the receptacle of an individual connector port subsequent to the initial deployment of the distribution cable. In another embodiment, one or more connectorized drop cables are routed to the plug of an individual connector port subsequent to the initial deployment of the distribution cable and interconnected with the plug through an alignment means, such as an adapter or connector alignment sleeve. In yet another embodiment, one or more connectorized drop cables are routed to a receptacle provided within an external wall of a network connection terminal from outside the terminal, while one or more individual connectors of the tether assembly are routed to the receptacle from inside the network connection terminal. In all embodiments, the receptacle or plug may be configured with a variety of connector types, such as but not limited to SC, LC, DC, FC, ST, SC/DC, MT-RJ, MTP, MPO and other like single or multi-fiber ferrules now known or hereafter developed.

In all of the embodiments shown and described herein, various types of distribution cables may be accommodated, such as monotube, loose tube, central tube, ribbon and the like. One example of a type of distribution cable suitable for use in conjunction with the present invention is an ALTOS® dielectric cable available from Coming Cable Systems LLC of Hickory, N.C. The ALTOS® dielectric cable is a lightweight fiber optic cable designed for both buried (conduit) and aerial (lashed) deployments. In another example, the distribution cable is a Standard Single-Tube Ribbon (SST-Ribbon™) cable available from Coming Cable Systems LLC of Hickory, N.C. The SST-Ribbon™ cable contains readily identifiable twelve-fiber ribbons in a gel-filled tube. Regardless, the distribution cable is preferably designed to provide stable performance over a wide range of temperatures and to be compatible with any telecommunications grade optical fiber. As used herein, the term "optical fiber" is intended to include all types of single mode and multi-mode light waveguides, including one or more bare optical fibers, coated optical fibers, loose-tube optical fibers, tight-buffered optical fibers, ribbonized optical fibers or any other expedient for transmitting light signals now known or hereafter developed. In preferred embodiments, the distribution cable is flexible, easy to route and has no preferential bend, except perhaps adjacent a factory-prepared mid-span access location. In all embodiments shown and described herein, various types of tether cables may also be accommodated, such as monotube, loose tube, central tube and ribbon, and the tether cable may be disposed within another tubular body in a cable assembly.

Referring now to FIG. 1, a tether assembly 20 including a preselected or customized length of a tether cable 22 adapted to be attached to a distribution cable (not shown) at a mid-span access location is shown. In this exemplary embodiment, the tether cable 22 contains a plurality of optical fibers and terminates in a furcation 24 that separates the optical fibers within the tether cable 22 into a plurality of individual connector ports 28. Each connector port 28 provides access to at least one optical fiber of the tether cable 22 that is interconnected with at least one optical fiber 22 terminated from the distribution cable at the mid-span access location. As shown in FIG. 1, each connector port 28 comprises a receptacle 30 operable for receiving an optical connector mounted upon the end of an optical fiber routed to the receptacle 30 through a furcation leg 26 of the tether assembly 20 and a plug 32 of a connectorized fiber optic cable, such as a branch cable or a drop cable, referred to generically hereinafter as a drop cable 34. The connector port 28, and in particular the receptacle 30, provides access to one or more connectorized optical fibers of the tether cable 22 that are optically connected to optical fibers accessed and terminated at the mid-span access location of the distribution cable. The connector ports 28 may be used to readily interconnect an optical fiber of the connectorized fiber optic drop cable 34 with a terminated optical fiber of the distribution cable at a desired location in a fiber optic communications network. As used herein, the term "connector port" is intended to broadly include any component provided at the free end of a furcation leg 26 of the tether assembly that facilitates optical connection of an optical fiber of the tether cable 22 to an optical fiber of the connectorized drop cable 34. In the exemplary embodiments shown and described herein, the connector port 28 comprises a receptacle 30 (e.g., FIGS. 1 and 2), a plug 42 (e.g., FIGS. 3-5) and a fiber optic connector 96, 97 (e.g., FIGS. 8 and 9). However, the connector port 28 may also comprise a factory-installed adapter or connector alignment sleeve positioned within the receptacle 30 or a field-installed adapter or connector alignment sleeve (e.g., alignment means 46 shown in FIGS. 3 and 4) for aligning and maintaining mating connectors in opposing physical contact. In various embodiments, the connector port 28 further provides an environmental seal at the optical connection between the optical fiber of the furcation leg 26 and the optical fiber of the drop cable 34. The connector port 28 may also serve to strain relieve the furcation leg 26 and/or the drop cable 34 by transferring any tension load applied to the furcation leg 26 and/or the drop cable 34 to the structure (e.g., housing) of the connector port 28 in a known manner.

The tether cable 22 may be any fiber optic cable having a preselected or customized length and containing one or more optical fibers. As shown, the tether cable 22 comprises a tubular jacket or sheath 36 adapted to be attached to the distribution cable at a mid-span access location and configured to route and protect the optical fibers between the distribution cable and the furcation 24. The furcation 24 comprises a rugged body that is secured to the downstream end of the tether cable 22. At least one, and preferably a plurality, of individual furcation legs 26 are secured within the body of the furcation 24 by an epoxy material in a known manner to form a conventional furcation plug. The furcation legs 26 may be any type of fiber optic jacket, sheath or cable containing one or more optical fibers of the tether cable 22. As shown, each furcation leg 26 comprises a tubular body that is attached to the tether cable 22 at the furcation 24 and in which one or more optical fibers of the tether cable 22 are routed and protected. In one example, 900 micron optical fibers are routed and protected within a tubular body having a greater diameter, such as 0.002 inches (2 mil). The individual furcation legs 26 may have the same preselected or customized length, or may have varying lengths so as to stagger the connector ports 28 along the length of the distribution cable and thereby reduce the combined diameter of the tether assembly 20 and distribution cable. In this manner, a distribution cable assembly having a "low profile" may be deployed through a conduit having a relatively small inner diameter or significant bends, or over conventional aerial lashing equipment. In one embodiment, the upstream end of the tether cable 22 is attached to the distribution cable at a mid-span access location and the tether assembly 20 (e.g., tether cable 22 and furcation legs 26) are removably or slideably strapped to the distribution cable in the factory such that the tether assembly 20 may be slid along the length of the distribution cable or removed from the distribution cable after deployment in the field.

In another embodiment, the connector port 28 may be overmolded around its respective furcation leg 26 and the furcation 24 may be overmolded around the furcation legs 26 and tether cable 22 in order to provide a rugged and sealed (i.e., moisture impervious) assembly for use in an outdoor environment. Overmolding may also be used to attach the upstream end of the tether cable 22 to the distribution cable at the mid-span access location. The overmolding process, also known as "injection molding", involves preparing the sheath 36 of the tether cable 22 and the furcation legs 26 in a manner well known in the art, such as by cleaning and roughening, flame preparing or chemically preparing the surface to promote friction and adhesion with the overmolding material. The receptacles 30, including their respective optical connectors and optical fibers, the furcation legs 26 and the downstream end of the tether cable 22 are suspended within a suitable overmolding tool and the overmolding material is poured or injected into the overmolding tool so that the overmolding material surrounds and encapsulates the receptacles 30, furcation legs 26 and the downstream end of the tether cable 22. In alternative embodiments, a protective layer, such as, but not limited to, a foil made of tin or aluminum, may be used to protect the receptacles 30, furcation legs 26 and tether cable 22 prior to overmolding. However, other materials may be used to protect the underlying components prior to overmolding, provided that the material is capable of being shaped to conform to the outer profile of the components.

Once the components have been appropriately protected, if desired, and positioned within a first portion of the overmolding tool, a second portion of the overmolding tool may be joined to the first portion to form an internal cavity for receiving the overmolding material. Suitable examples of overmolding materials include, but are not limited to, polyurethanes, silicone and like rugged, yet flexible materials. The overmolding materials are poured or injected into the internal cavity defined by the overmolding tool. The overmolding material provides a protective shell, maintains sealing integrity and is preferably capable of withstanding crush forces up to at least about 300 lbs. As a result of the overmolding process, the connector ports 28 and furcation 24 have a smooth, low-profile shape with a rounded or tapered exterior so as to avoid snagging during deployment of the distribution cable and tether assembly 20 through conduits or aerial lashing equipment.

Figure 2:
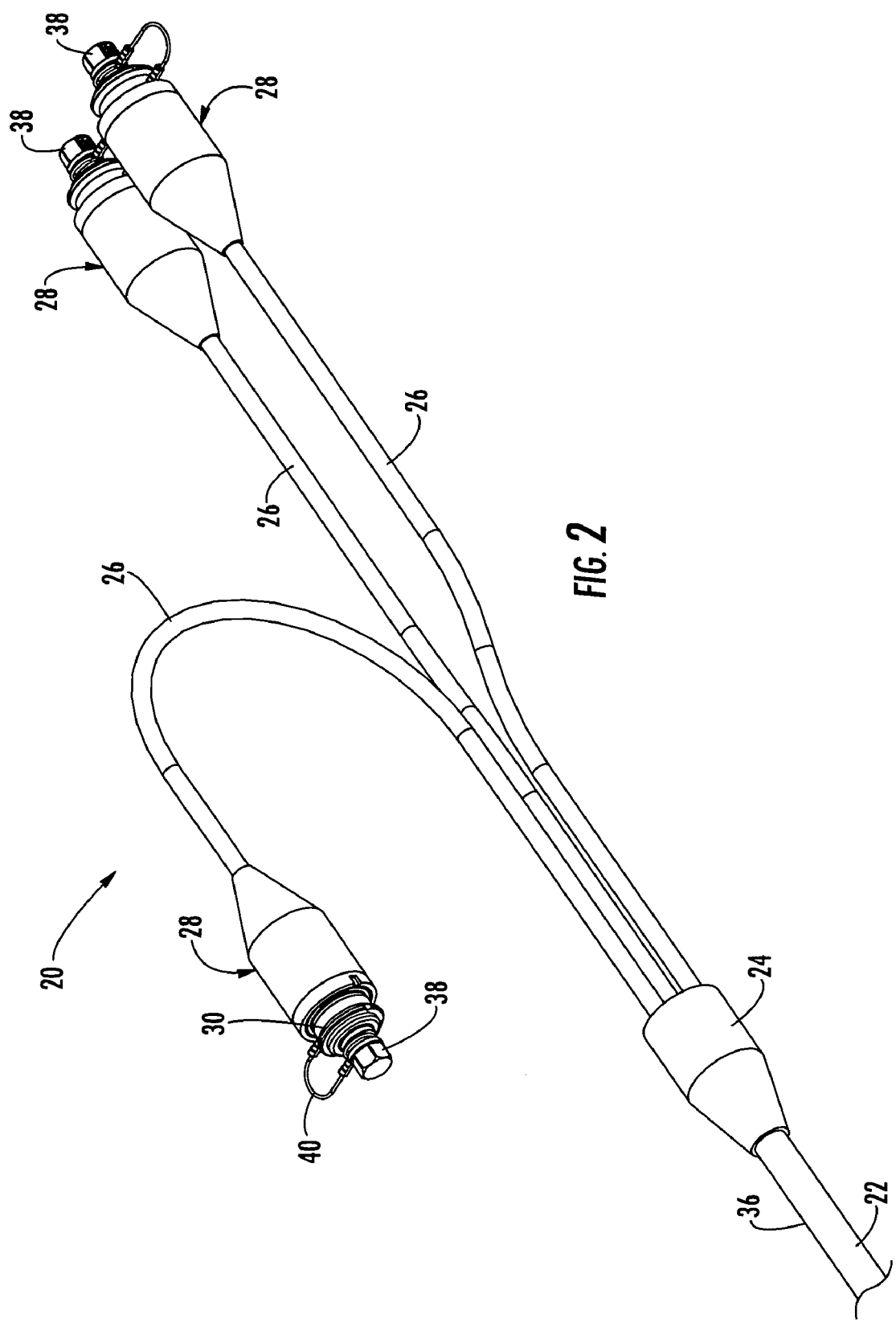
FIG. 2 is a perspective view of the tether assembly of claim 1 shown with the receptacles of the individual connector ports covered with protective dust caps.

The embodiment of the tether assembly 20 shown in FIG. 1 comprises three furcation legs 26 and connector ports 28 for optically connecting the optical fibers of the tether cable 22 to optical fibers of one or more drop cables 34. The optical fibers of the tether cable 22 are in turn interconnected with the optical fibers of the distribution cable accessed and terminated at the mid-span access location. Thus, the tether assembly 20 of the present invention is operable for interconnecting terminated optical fibers of a distribution cable with optical fibers of one or more drop cables 34. While three identical furcation legs 26 and connector ports 28 are shown, it is envisioned that the tether assembly 20 may have any number of furcation legs 26 and any number of connector ports 28. It is also envisioned that each furcation leg 26 of the tether assembly 20 may terminate in more than one connector port 28. In addition, the furcation legs 26 and/or connector ports 28 may be color-coded or provided with other indicia to identify particular optical fibers of the tether cable 22, and consequently, particular terminated optical fibers of the distribution cable. Referring to FIG. 2, the tether assembly 20 is shown with each connector port 28, and more particularly with each receptacle 30, covered by a protective dust cap 38 during shipping and deployment and until the connector port 28 is needed. The protective dust cap 38 prevents water and other contaminants (e.g., dust, dirt, insect infestation) from entering the connector port 28 and damaging the optical fiber(s) disposed therein. As shown, the protective dust cap 38 is secured to the receptacle 30 by a lanyard, such as a conventional braided wire, to prevent the dust cap 38 from becoming separated from the receptacle 30 following removal.

Figure 3:
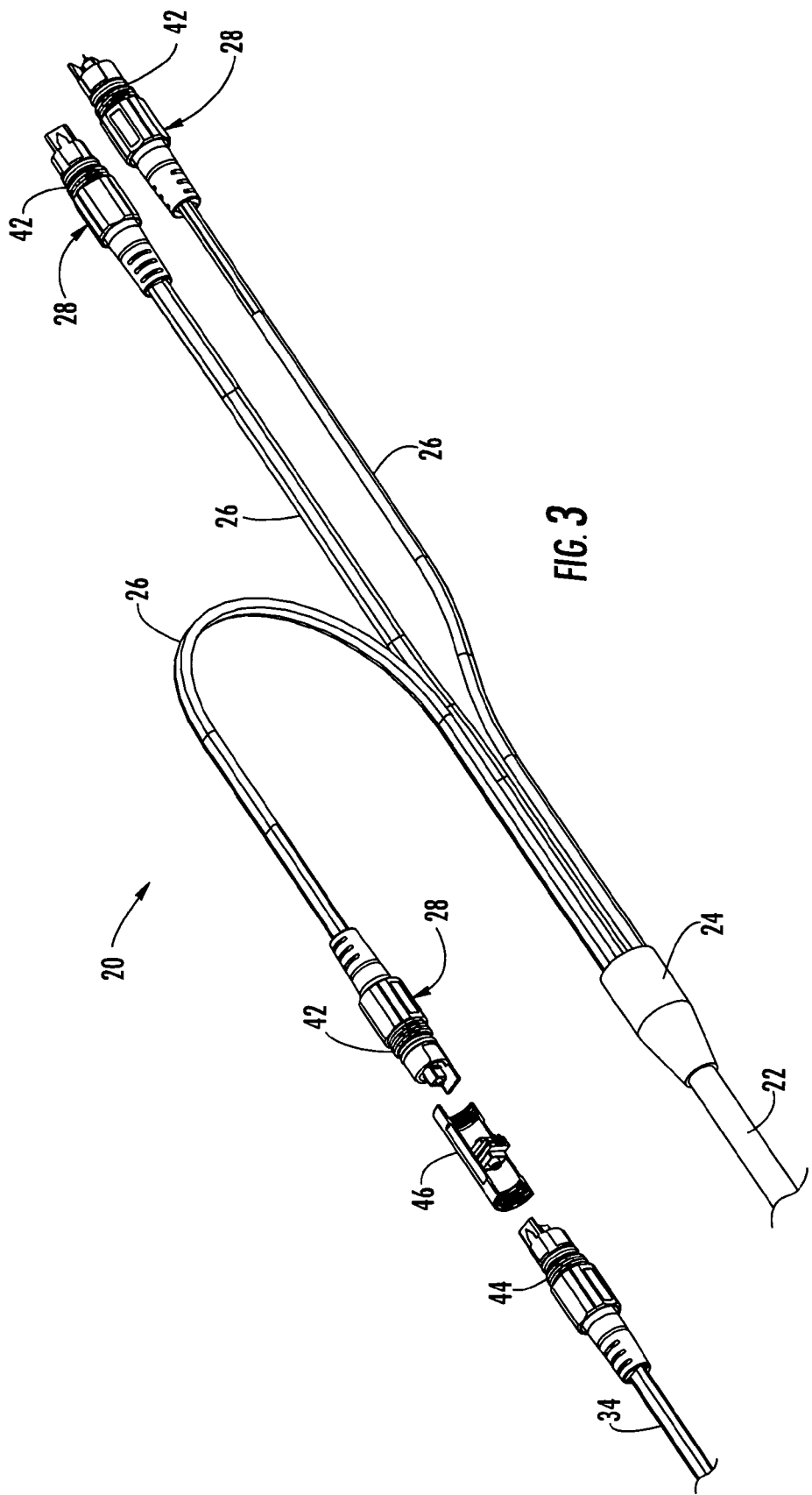
FIG. 3 is a perspective view of a tether assembly including a tether cable terminating in a plurality of individual connector ports comprising a plug for interconnection with a connectorized drop cable at a desired tap point in accordance with another exemplary embodiment of the present invention.
Figure 4:
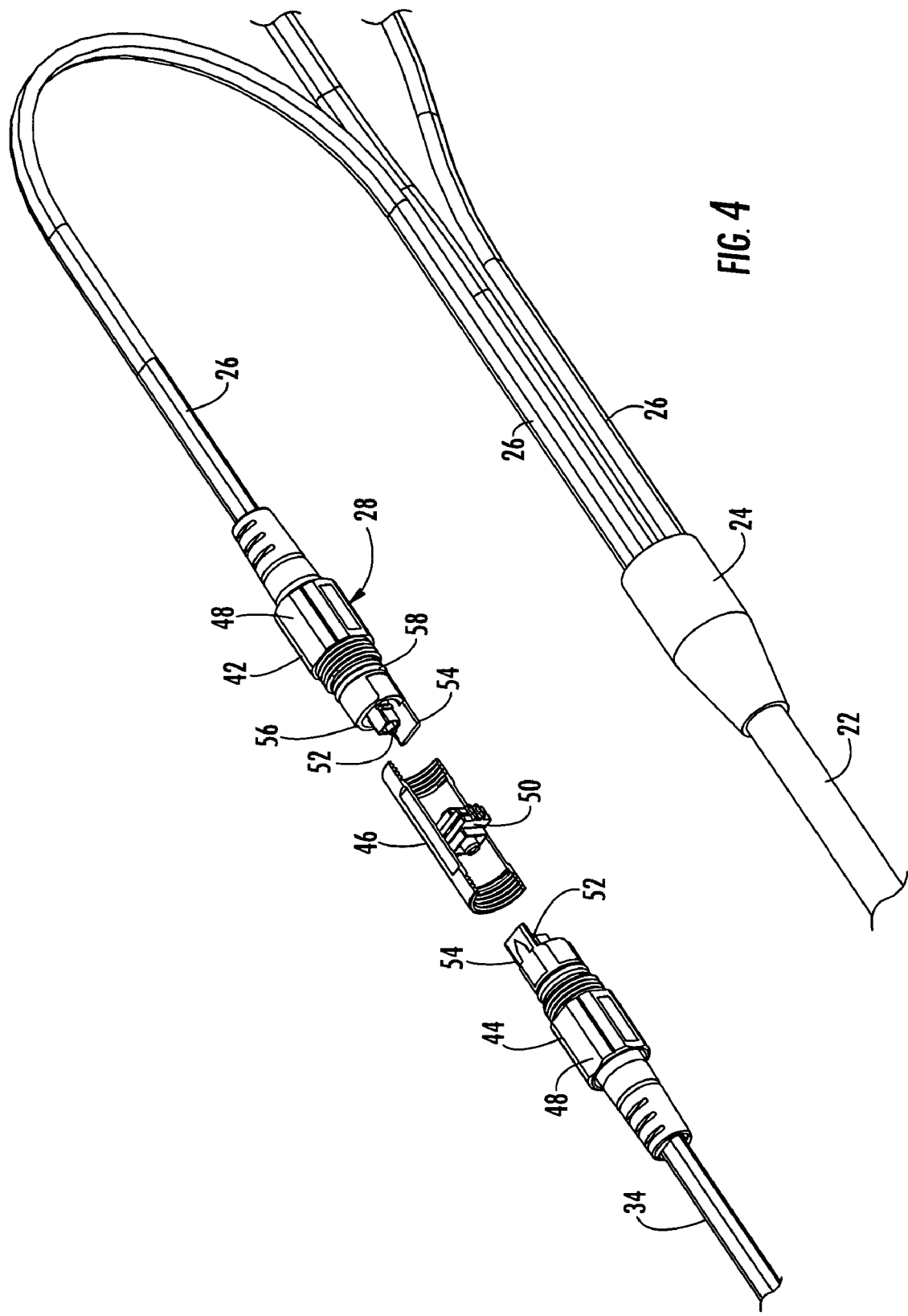
FIG. 4 is a detailed perspective view of one of the connector ports of the tether assembly of FIG. 3 shown with a plug alignment member in partial cross-section and with the plug of the tether assembly and the plug of a connectorized drop cable disconnected.

Referring to FIGS. 3 and 4, another embodiment of a tether assembly 20 including a preselected or customized length of tether cable 22 adapted to be attached to a distribution cable (not shown) at a mid-span access location is shown. FIG. 4 is a detailed perspective view of a typical one the connector ports 28 and a plug alignment member 46 for aligning and mating opposing optical connectors shown with the mating plugs 42, 44 disconnected from the plug alignment member 46. In this embodiment, connector port 28 comprises a plug 42 that is less rugged and environmentally protected than the connector port 28 comprising receptacle 30 shown in FIGS. 1 and 2. As a result, the connector port 28 of the embodiment shown in FIGS. 3 and 4 is suitable for deployment in environments that have less stringent strain relief and environmental sealing requirements as the embodiment of the connector port 28 shown in FIGS. 1 and 2. In this latter embodiment, the tether cable 22 terminates in a furcation 24 that separates the optical fibers contained within the tether cable 22 into individual furcation legs 26. Each furcation leg 26 and respective connector port 28 provides access to at least one optical fiber of the tether cable 22 that is interconnected with at least one optical fiber of the distribution cable accessed and terminated at a mid-span access location along the length of the distribution cable. Preferably, each connector port 28 comprises a plug 42 similar in shape, structure and operation to a corresponding plug 44 of a fiber optic drop cable 34. A plug alignment member 46 is operable for receiving the plug 42 of a connector port 28 on one side and the plug 44 of a connectorized fiber optic drop cable 34 on the opposing side of the plug alignment member 46 to thereby align and optically connect an optical fiber of the tether cable 22 (and consequently an optical fiber terminated from the distribution cable) with an optical fiber of the drop cable 34.

The plug alignment member 46 defines a through channel having opposing ends that are internally threaded so as to receive and secure externally threaded coupling nuts 48 of the plugs 42, 44. Located medially within the channel of the plug alignment member 46 is an adapter or connector alignment sleeve 50 for aligning the opposing ferrules 52, and consequently the opposing optical fibers, of the mating plugs 42, 44. The mating plugs 42, 44 each define a keying feature 54 so that the plugs 42, 44 can be inserted into the plug alignment member 46 only in a predetermined orientation. The channel of the plug alignment member 46 is provided with circumferential slots, recesses, ridges or protrusions, and the plugs 42, 44 are inserted into the channel with the respective keying features 54 opposite on another in a well known manner such that the plugs 42, 44 are in the predetermined orientation. This capability is especially important when mating opposing APC ferrules, such as SC APC ferrules of the type available from Corning Cable Systems LLC of Hickory, N.C., that must be aligned in an opposite orientation to prevent signal losses. By keying the plugs 42, 44 and polishing all of the ferrules 52 in the same manner, the opposing optical fibers can be properly aligned by inserting plug 42 and plug 44 into the channel of the plug alignment member 46 with the keying features 54 in the predetermined orientation. The keying features 54 may also contact a flat surface or "stop" 56 of a mating plug as the keying feature 54 passes beyond the connector alignment sleeve 50. An O-ring 58 may also be provided on the plug 42, 44 to form an environmental seal between the plugs 42, 44 and the plug alignment member 46 as the external threads of the coupling nut 48 engage the internal threads of the plug alignment member 46.

Figure 5:
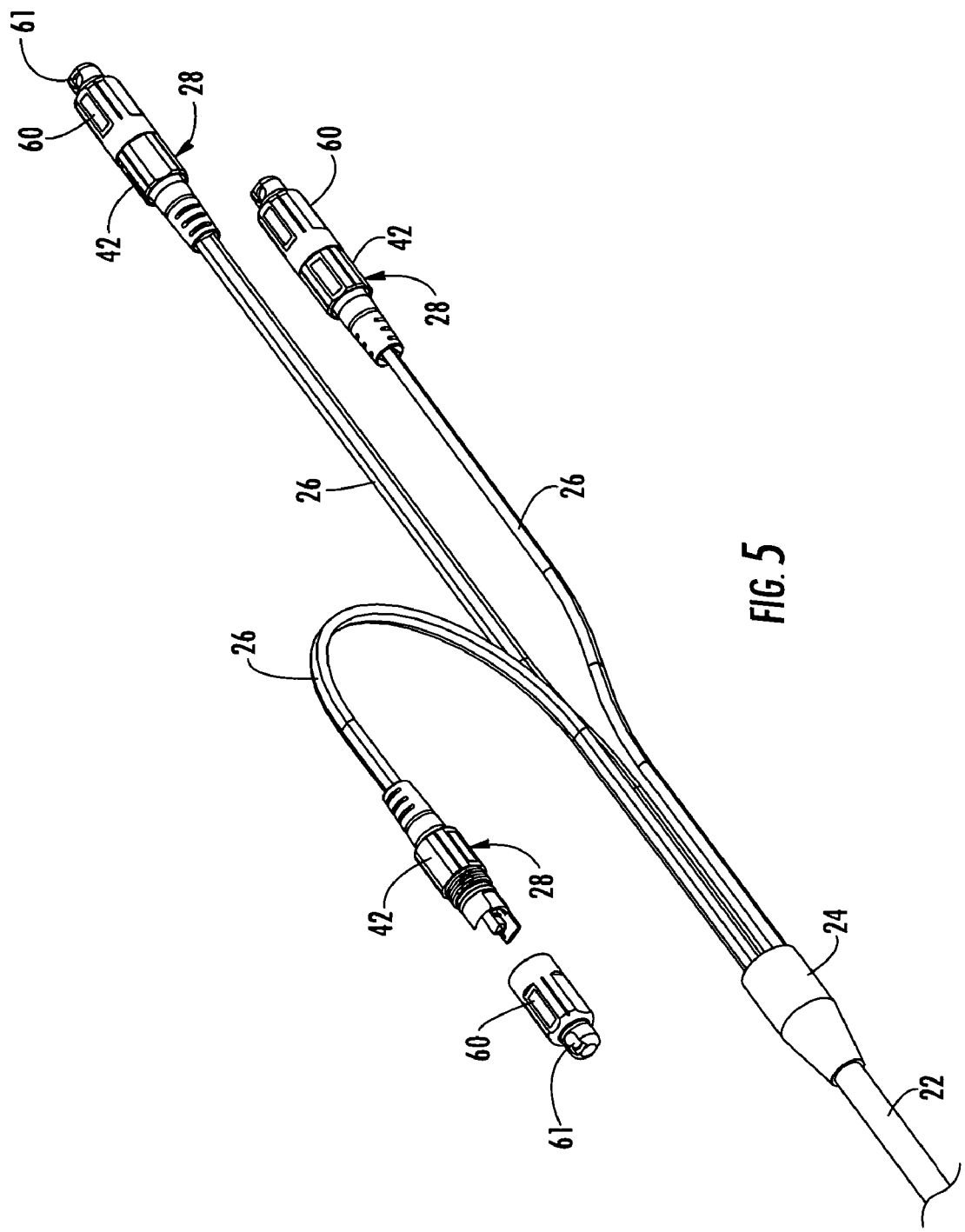
FIG. 5 is a perspective view of the tether assembly of FIG. 3 shown with the plugs of the individual connector ports covered with protective dust caps.

As in the previous embodiment shown in FIGS. 1 and 2, the tether cable 22 of the tether assembly 20 of FIGS. 3 and 4 may be any fiber optic cable having a preselected or customized length and containing one or more optical fibers that terminates in one or more furcation legs 26 having one or more connector ports 28. The furcation 24 comprises a rugged body that is secured to the downstream end of the tether cable 22 and the furcation legs 26 are secured within the body of the furcation 24 by an epoxy material in a known manner to form a conventional furcation plug. The individual furcation legs 26 may have the same preselected or customized length, or may have varying lengths so as to stagger the connector ports 28 along the length of the distribution cable and thereby reduce the combined diameter of the tether assembly 20 and distribution cable. In this manner, a distribution cable assembly having a "low profile" may be deployed through a conduit having a relatively small inner diameter or significant bends, or over conventional aerial lashing equipment. In one embodiment, the upstream end of the tether cable 22 is attached to the distribution cable at a mid-span access location and the tether assembly 20 is removably or slideably strapped to the distribution cable in the factory such that the tether assembly 20 may be removed from or slid along the length of the distribution cable. The exemplary embodiment shown in FIGS. 3 and 4 comprises three individual furcation legs 26 and connector ports 28 comprising plugs 42 for optically connecting optical fibers of the tether cable 22 with optical fibers of one or more drop cables 34. The optical fibers of the tether cable 22 are in turn interconnected with the optical fibers of the distribution cable accessed and terminated at the mid-span access location. Referring to FIG. 5, the tether assembly 20 is shown with each connector port 28, and more particularly with each plug 42, covered by a protective dust cap 60 during shipping and deployment and until the connector port 28 is needed. The protective dust cap 60 prevents water and other contaminants (e.g., dust, dirt, insect infestation) from entering the connector port 28 and damaging the optical fiber(s) disposed therein. The protective dust cap 60 may be secured to the plug 42 by a lanyard, such as a conventional braided wire, as previously described, and may be provided with an eyelet 61 for pulling the corresponding furcation leg 26 and plug 42 through a conduit. As shown, the protective dust cap 60 is internally threaded to secure the dust cap 60 onto the plug 42.

Figure 6:
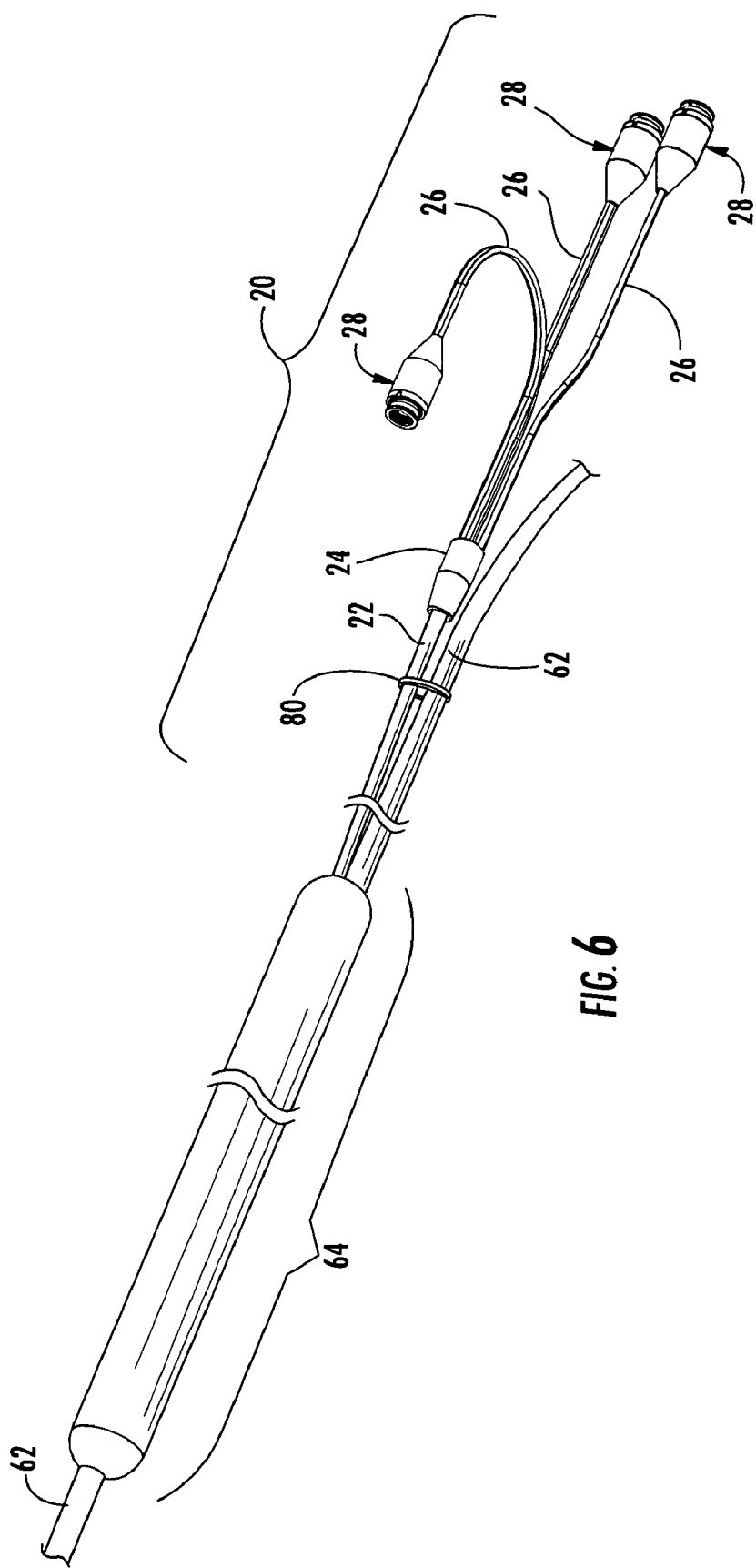
FIG. 6 is a perspective view of a fiber optic distribution cable assembly including the tether assembly of FIG. 1 attached to the distribution cable at a predetermined mid-span access location.
Figure 7:
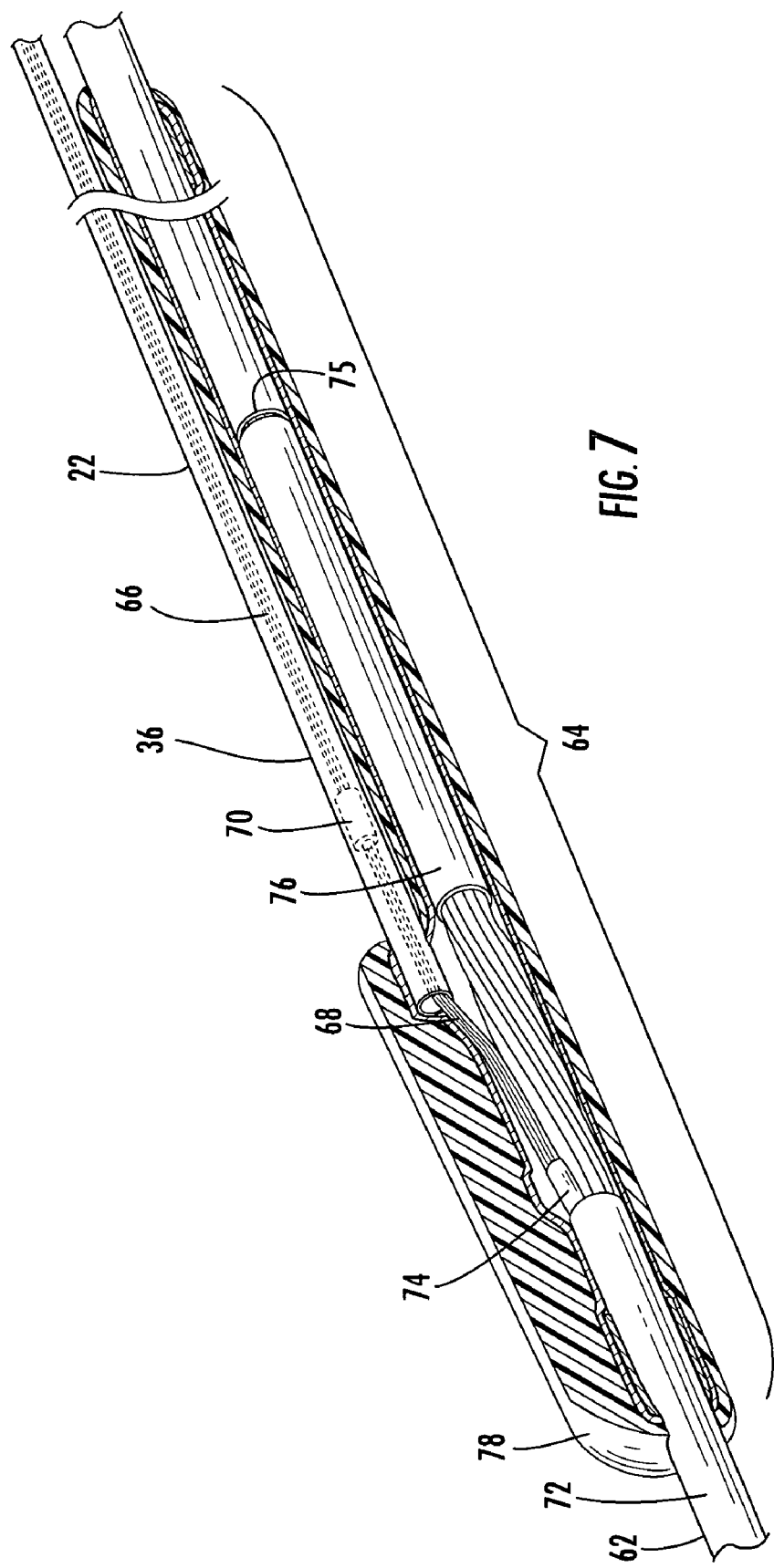
FIG. 7 is a perspective view of a typical mid-span access location positioned along the length of a fiber optic distribution cable shown with the tether cable of the tether assembly of FIG. 1 attached to the mid-span access location and overmolded in the factory or in the field using a field repair kit.

Referring to FIG. 6, a factory-prepared fiber optic distribution cable assembly including a tether assembly 20 comprising a tether cable 22 terminating in a plurality of connector ports 28 as previously described is shown attached to the distribution cable 62 at a typical mid-span access location 64. In the embodiment shown, the mid-span access location 64, also referred to herein as a "tether attach point" is overmolded in the factory. In alternative embodiments wherein the tether assembly 20 is attached to a mid-span access location 64 subsequent to deployment of a distribution cable, the mid-span access may be performed in the field and the mid-span access location 64 may be overmolded or encapsulated with a conventional protective enclosure in the field. The mid-span access location 64 provides a means for optically connecting one or more optical fibers of the tether cable 22 to one or more optical fibers accessed and terminated from the distribution cable 62. As best shown in the alternative overmolded embodiment illustrated in FIG. 7, the tether cable 22 comprises a tubular jacket or sheath 36 adapted to be attached to the distribution cable 62 at the mid-span access location 64 and configured to contain one or more optical fibers 66 disposed within the sheath 36. As is well known and understood in the art, the optical fibers 66 of the tether cable 22 may be spliced in any conventional manner, such as by fusion or mechanical splicing, either individually or in mass, to one or more optical fibers 68 accessed and terminated from the distribution cable 62. The splice connections are shown schematically by reference numeral 70 and may be located either within the tether cable 22 or within the overmolded body 78 between the distribution cable 62 and the tether cable 22. In an alternative embodiment, the optical fibers 68 of the distribution cable 62 may be optically connected to the optical fibers 66 of the tether cable 22 by one or more single fiber or multifiber optical connectors mounted upon the ends of the optical fibers (i.e., a "pigtail").

The mid-span access location 64 is the position along the length of the distribution cable 62 at which the optical fibers 68 are accessed, terminated and routed separately from the remaining intact optical fibers (not shown) of the distribution cable 62. To prepare a mid-span access location 64 in either the field or the factory, a section of the sheath 72 of the distribution cable 62 is removed to expose the optical fibers 68 within the cable sheath 72. As shown in the exemplary embodiment provided herein, the optical fibers 68 are disposed within individual buffer tubes 74 that are helically wound within the cable sheath 72 in a known manner. The exposed length of the distribution cable 62 and the buffer tubes 74 may vary depending on the length of the optical fibers 68 needed and the manner in which the optical fibers 68 are accessed and terminated. However, in a preferred embodiment, the length ranges between about 3 and about 36 inches. In one example of accessing the optical fibers from the distribution cable 62, a ring-cut 75 may be made through the cable sheath 72 downstream of the exposed section of buffer tubes 74. By ring cutting the cable sheath 72, a portion 76 of the cable sheath 72 becomes slidable along the exposed section of buffer tubes 74 and may remain in place to cover the exposed section of buffer tubes 74 once the one or more optical fibers 68 have been severed and the ends removed, referred to in the art as "fished," from their respective buffer tube 74. The exposed section of the buffer tubes 74 allows for about 5 to about 30 inches of the optical fibers 68 to be withdrawn from the appropriate buffer tube 74 for subsequent splicing, thereby providing sufficient slack fiber length for more than one splice attempt.

For a given mid-span access location 64, the buffer tube 74 may be accessed in multiple places using a standard No-Slack Optical Fiber Access Tool (NOFAT) available from Corning Cable Systems LLC of Hickory, N.C. The NOFAT tool is suitable for use in locations in which a limited amount of cable slack can be obtained and the buffer tubes 74 remain helically wrapped around a central member (not shown). The NOFAT tool provides a guide that allows a scalpel to open a buffer tube 74 without cutting completely through the buffer tube 74 and without damaging the optical fibers disposed within the buffer tube 74. The NOFAT tool is compatible with standard sizes of buffer tubes 74 utilized in Corning Cable Systems ALTOS® Cable.

Although not shown, two buffer tube access cuts are preferably made on the appropriate buffer tube 74. Starting at the downstream access cut, preselected optical fibers 68 are accessed and severed. For example, in a buffer tube 74 comprising twelve optical fibers, only four or eight of the optical fibers may be terminated. Alternatively, optical fibers 68 may be accessed and terminated from more than one buffer tube 74 in a like manner. The remaining optical fibers disposed within the buffer tube(s) 74 are not cut and continue downstream through the distribution cable 62. The severed optical fibers 68 are then fished out through the upstream access cut on the same buffer tube 74, thereby exposing a total optical fiber length of about 5 to 30 inches. The optical fibers 68 are transitioned smoothly out of the buffer tube 74 and then spliced, as described above, to the optical fibers 66 of the tether cable 22. The tether cable 22 may be securely attached at the mid-span access location 64 by overmolding the upstream end of the tether 22 along with the mid-span access location 64 within the overmolded body 78. Alternatively, in embodiments in which the mid-span access location 64 is not overmolded, the tether cable 22 may be secured to the distribution cable assembly at the mid-span access location 64 using a conventional fastener or a similar feature provided within a conventional closure.

Referring again to FIG. 6, the tether cable 22 has a preselected or customized length sufficient to ensure that the tether assembly 20 (and in particular the connector ports 28 of the individual furcation legs 26) may be positioned at a desired location in the fiber optic communications network regardless of the actual position of the mid-span access location 64. The length of tether cable 22 permits the distribution cable assembly to be pre-engineered and factory-assembled without absolute accuracy in the position of the mid-span access location 64 in the fiber optic communications network. The tether assembly 20, and particularly tether cable 22, is typically securely lashed to the distribution cable 62 by straps, clamps or other like fasteners, such as cable ties 80 shown herein, at predetermined intervals along the length of the tether cable 22 and furcation legs 26. The cable ties 80 inhibit lengthwise movement of the tether assembly 20 along the distribution cable 62. The tether assembly 20 may be lashed to the distribution cable 62 in the factory and wound onto a cable reel as a pre-engineered distribution cable assembly. The factory-prepared tether assembly 20, including the tether cable 22, furcation legs 26 and connector ports 28 are sufficiently flexible so as to permit the distribution cable assembly to be wound onto a cable reel, shipped and deployed through relatively small-diameter conduit or over conventional aerial lashing equipment. The cable ties 80 remain in place during deployment of the distribution cable 62 and may be removed following deployment when the mid-span access location 64, and more particularly the individual connector ports 28, are utilized as a tap point in the fiber optic communications network. The connector ports 28 comprising receptacles 30 (as shown) or plugs 42 are then positioned at the desired tap point location in the fiber optic communications network. Depending upon the amount of slack length of the tether cable 22 to be managed, the slack length may be coiled and lashed to the distribution cable 62, an aerial cable strand or telephone pole, for example, or may be coiled and stored within a pedestal, vault or hand-hole in a known manner.

Figure 8:
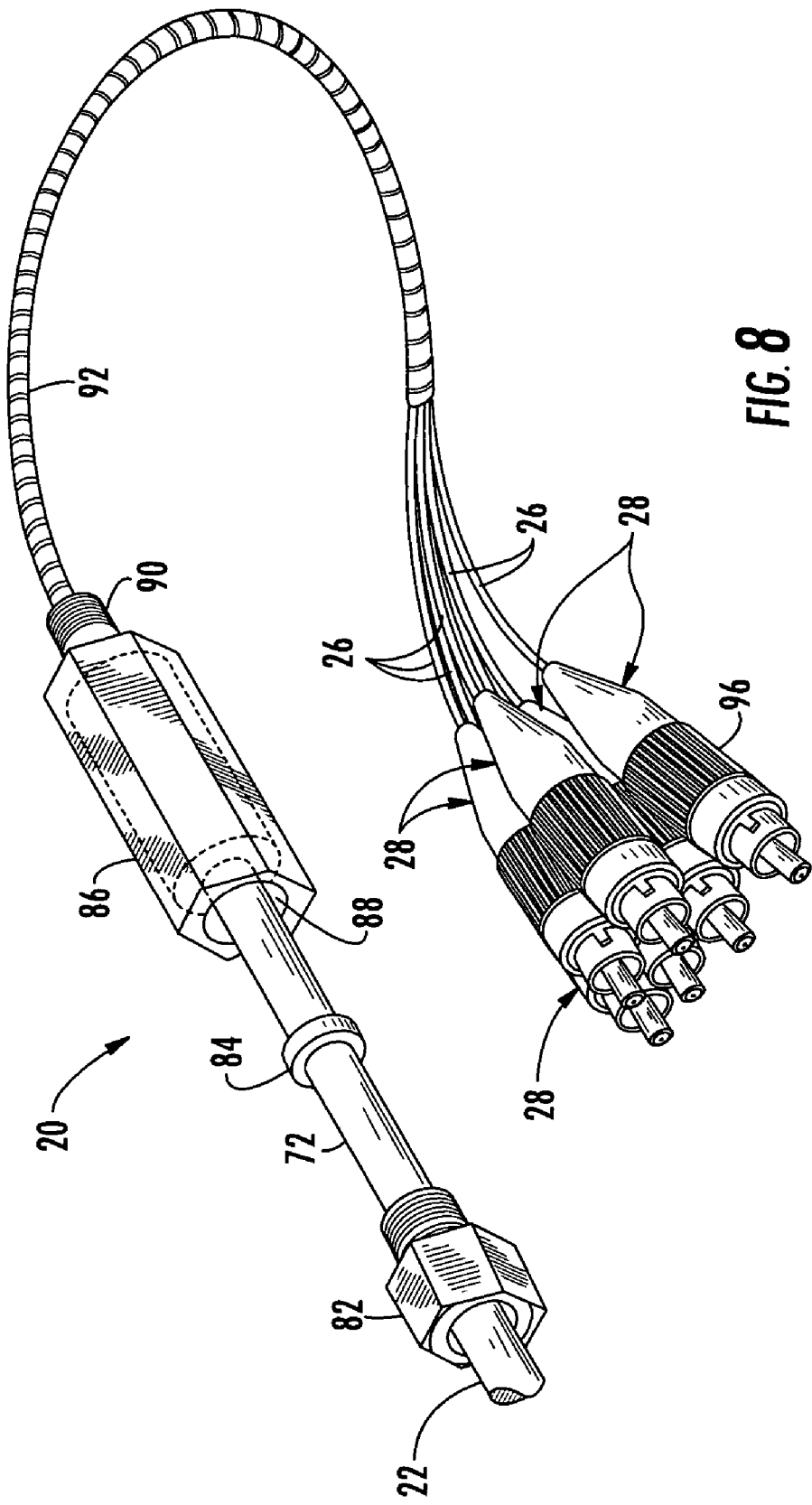
FIG. 8 is a perspective view of a tether assembly including a tether cable, a furcation plug adapted to be secured to an exterior wall of a network connection terminal and a plurality of individual connectors adapted to be routed to corresponding receptacles disposed within an exterior wall of the network connection terminal in accordance with another exemplary embodiment of the present invention.
Figure 9:
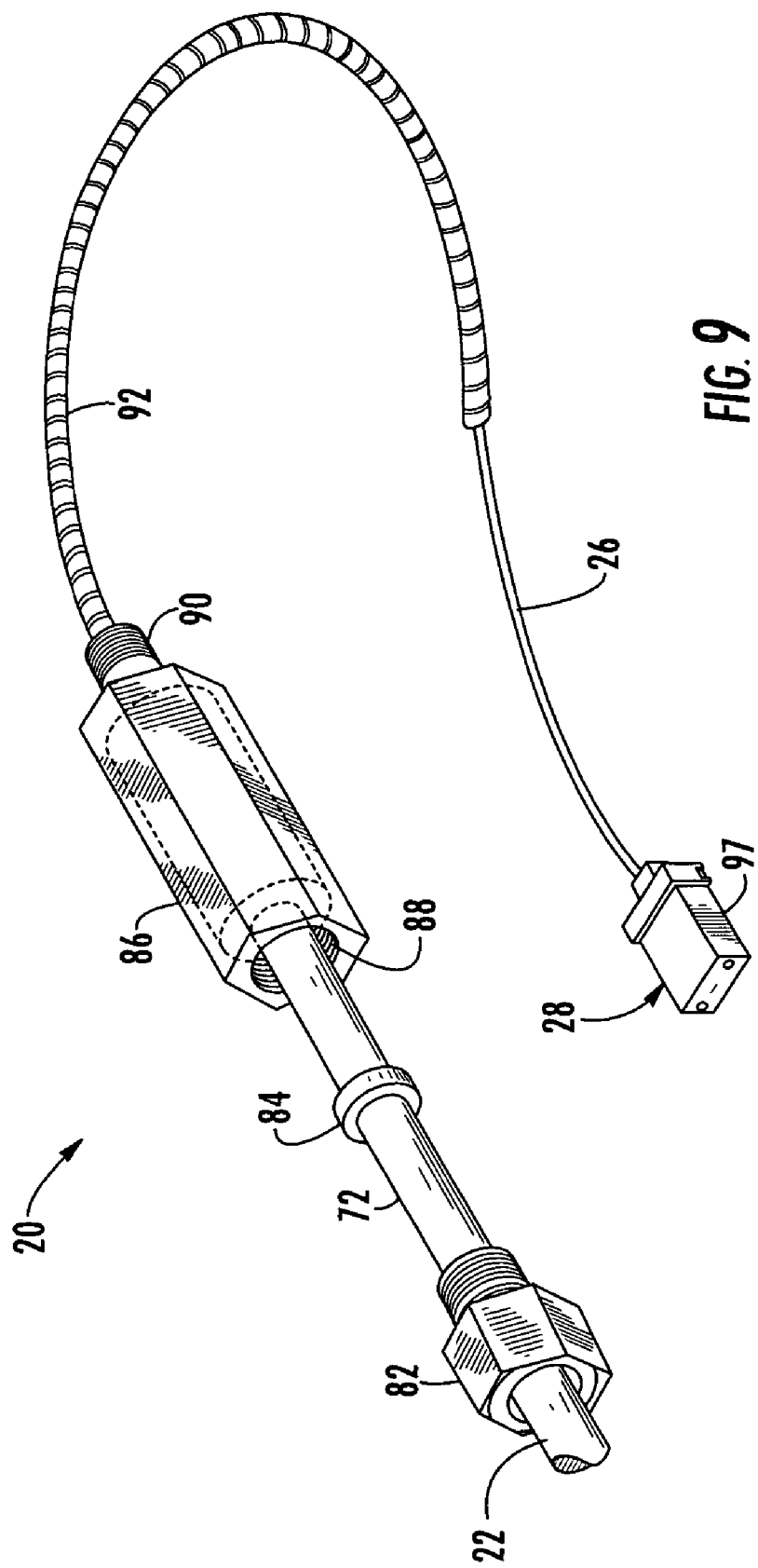
FIG. 9 is a perspective view of a tether assembly including a tether cable, a furcation plug adapted to be secured to an exterior wall of a network connection terminal and a multi-fiber connector adapted to be routed to a corresponding connector port disposed within an exterior wall of the network connection terminal in accordance with another exemplary embodiment of the present invention.

Referring to FIG. 8, yet another embodiment of a tether assembly 20 including a preselected or customized length of a tether cable 22 adapted to be attached to a distribution cable (not shown) at a mid-span access location and a plurality of individual connector ports 28 is shown. In this exemplary embodiment, the tether cable 22 contains a plurality of optical fibers and terminates in a furcation 86 that separates the optical fibers within the tether cable 22 into a plurality of furcation legs 26, as previously described. A nut 82 and sealing grommet 84 are placed over the tether cable sheath 72 to seal the tether cable 22 within the furcation 86, as will be described. The furcation 86 defines an opening 88 at one end for receiving the downstream end of the tether cable 22 and has an externally threaded portion 90 at the opposite end for receiving an internally threaded nut (not shown) to secure the furcation 86 within an opening defined by an external wall of a network connection terminal or other enclosure. The furcation legs 26 may be routed separately or may be bundled together, for example, by a spiral wrap material 92 wound over the bundle of furcation legs 26. After an epoxy material has been injected through the opening 88 into an internal cavity defined by the furcation 86, the sealing grommet 84 is positioned within the opening 88 and the nut 82 is fastened to the furcation 86 to seal the opening 88 and thereby form a moisture impervious furcation plug. The epoxy also functions to strain relieve the tether cable 22 and the furcation legs 26 at the furcation 86 so that tensile forces applied to the tether cable 22 or a furcation leg 26 are transferred to the furcation 86 without damaging the optical fibers contained within the tether cable 22 or the furcation legs 26. As shown in FIG. 8, each connector port 28 comprises a single fiber optical fiber connector 96, such as an SC APC style connector available from Corning Cable Systems LLC of Hickory, N.C. FIG. 9 illustrates another embodiment of a tether assembly 20 including a tether cable 22 and a furcation 86 that attaches to an external wall of a network connection terminal or other enclosure, as previously described. The tether assembly 20 further comprises a single furcation leg 26 that contains a plurality of optical fibers of the tether cable 22 and terminates in a single connector port 28 comprising a multi-fiber connector 97, such as an MT (mechanically transferable) style connector available from Corning Cable Systems LLC of Hickory, N.C.

Figure 10:
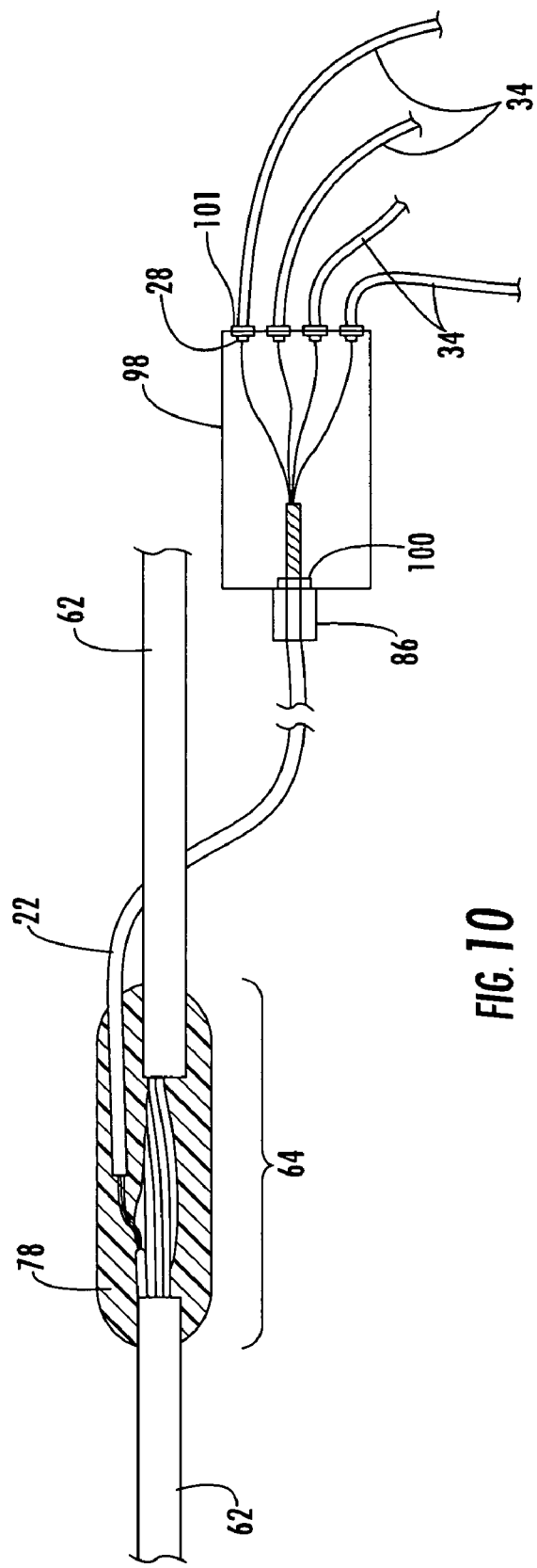
FIG. 10 is a schematic diagram of a fiber optic distribution cable assembly including the tether assembly of FIG. 8 shown with the first end of the tether cable attached to the distribution cable at a predetermined mid-span access location and the second end of the tether cable secured to an exterior wall of a network connection terminal.

Referring now to FIG. 10, the tether assembly 20 of FIG. 8 is shown attached to a distribution cable 62 at a typical mid-span access location 64 that has been prepared in the factory. However, the mid-span access location 64 may be prepared in the field and body 78 overmolded with the tether cable 22 using a field overmolding kit, as previously described. The tether cable 22 is routed to a conventional network connection terminal 98 (shown schematically), such as an aerial closure, below-grade closure, optical network terminal, pedestal, etc. defining two or more openings through an external wall of the enclosure for receiving the furcation 86 and the connector ports 28 of the tether assembly 20. Furcation 86 is secured to the network connection terminal 98 through an opening in the external wall of the enclosure by a conventional fastener 100 that engages threaded portion 90. The network connection terminal 98 is preferably provided with receptacles 101 disposed within openings through the external wall of the enclosure for securing the individual connector ports 28 (i.e., fiber optic connectors 96) routed inside the network connection terminal 98 from the furcation 86. The receptacles 101 likewise secure the mating connectorized drop cables 34 routed from outside the network connection terminal 98 to the connector ports 28. As previously described, the receptacles 101 may comprise an adapter or connector alignment sleeve for aligning the connectors 96 with the opposing connectors of the mating drop cables 34. If the distribution cable assembly, including the tether assembly 20, is factory-prepared for a pre-engineered fiber optic communications network, the distribution cable assembly is installed with the tether assembly 20 lashed to the distribution cable 62. After the distribution cable assembly is deployed and the mid-span access location 64 is needed, the lashings (e.g., cable ties 80) may be cut and the tether assembly 20 separated from the distribution cable 62 and routed to a desired tap point location, such as the network connection terminal 98. The connector ports 28 (i.e., connectors 96) and furcation legs 26 are routed into the network connection terminal 98 and to the receptacles 101 from inside the enclosure. The threaded portion 90 of the furcation 86 is fed into the opening through the external wall of the network connection terminal 98 and secured to the wall from the backside with fastener 100. Any tensile forces applied to the tether cable 22 are transferred to the furcation 86 and the wall of the network connection terminal 98, or to the overmolded body 78. The connectorized drop cables 34 may be connected or disconnected to the enclosure 98 at any time subsequent to deployment of the distribution cable assembly. As in the previous embodiments, the tether assembly 20 may be used to readily interconnect optical fibers of one or more connectorized fiber optic drop cables 34 with the optical fibers accessed and terminated from the distribution cable 62 at a desired tap point location in a fiber optic communications network. Once the network connection terminal 98 is positioned, any slack length of the tether cable 22 may be coiled and lashed to the distribution cable 62 or stored in any convenient manner. If the distribution cable assembly is deployed without the tether assembly 20, the downstream end of the tether cable 22 of a factory-prepared tether assembly 20 may be attached (e.g., spliced) to the distribution cable 62 at a mid-span access location 64 and the upstream end of the tether cable 22 routed to a network connection terminal 98 at a desired tap point location in the fiber optic communications network. Alternatively, the upstream end of the tether cable 22 may be attached to the network connection terminal 98 in the factory and the tether assembly 20, including the enclosure 98, attached to the distribution cable 62 at the mid-span access location 64, as previously described.

Figure 11:
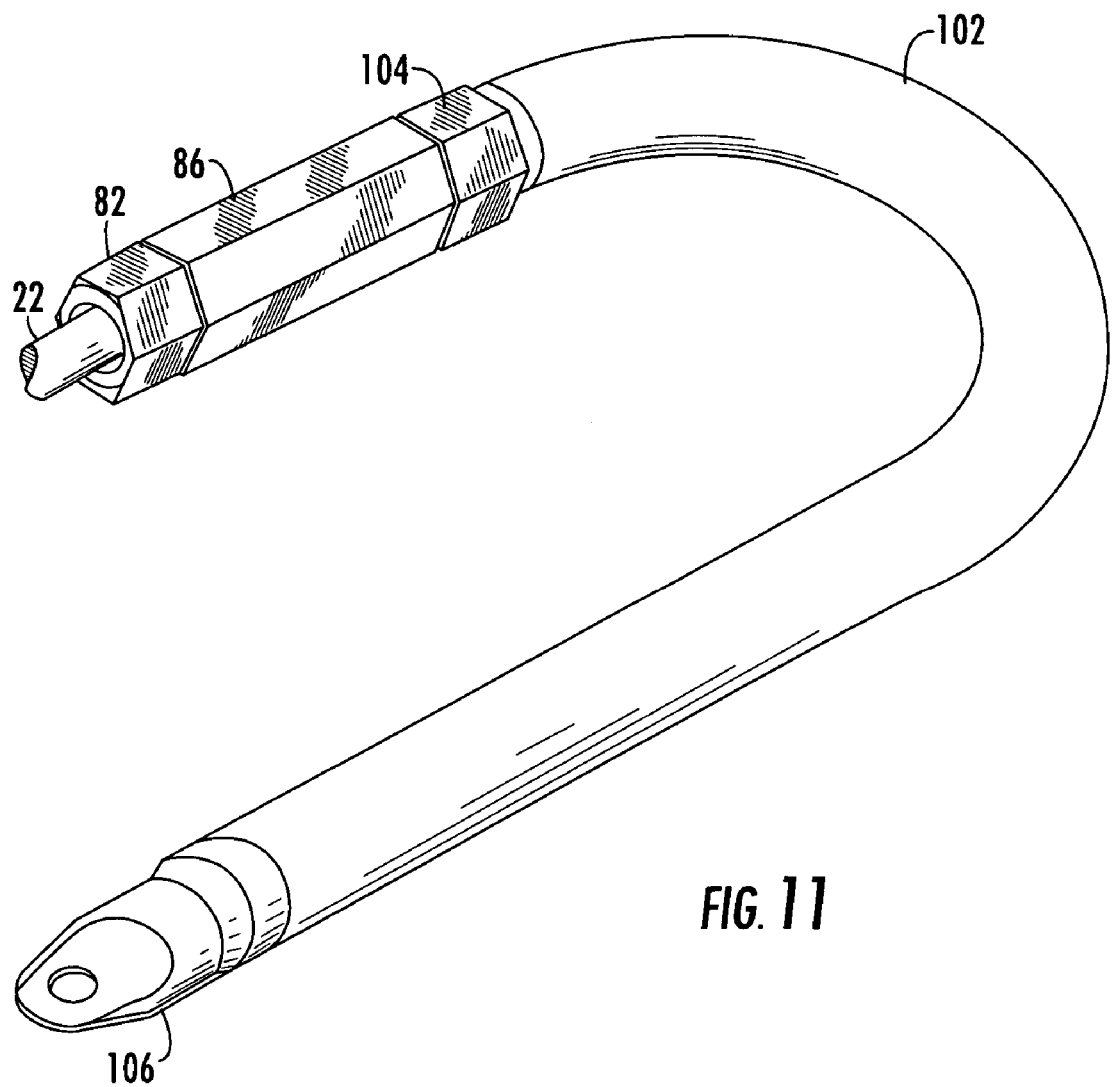
FIG. 11 is a detailed perspective view of the furcation plug of the tether assembly of FIG. 8.

Referring now to FIG. 11, a pulling member 102, for example a plug-and-play fiber optic cable pulling grip available from Corning Cable Systems LLC of Hickory, N.C., is used to cover the furcation legs 26 and connector ports 28 of the tether assembly 20 during shipping and deployment. The pulling member 102 is secured to the threaded portion 90 of the furcation 86 with a temporary coupling nut 104 that is replaced by the fastener 100 when the downstream end of the tether cable 22 is secured to the network connection terminal 98. In preferred embodiments, the pulling member 102 is waterproof and flexible, thus allowing it to bend during installation while preventing water and other contaminants from penetrating the pulling member 102 and damaging the furcation legs 26, optical fibers and connectors 96, 97 disposed within the pulling member 102. The pulling member 102 may be a flexible, strong tubular hose that may be a mesh of flexible metal or other material, such as a composite, plastic or rubber. The pulling member 102 typically includes a pulling loop 106 at the free to allow the pulling member 102 and the tether assembly 20 to be pulled through a conduit for example.

The exemplary embodiments of a tether assembly 20 and a fiber optic distribution cable assembly including a tether assembly 20 shown and described herein provide a number of significant advantages over previously known solutions for mitigating span length measurement differences and providing a tap point at a desired location in a fiber optic communications network. The tether assembly 20 permits a mid-span access location that is positioned at an incorrect location in a fiber optic communications network to be re-positioned at the desired tap point location following deployment of the distribution cable 62. By providing a tether assembly 20 including a tether cable 22 having a preselected or customized length, the tether cable 22 further provides the ability to extend the fiber optic communications network laterally from the distribution cable 62, for example across a street in a subdivision. In addition to the advantages described above, a tether assembly 20 constructed in accordance with the present invention provides a field technician with the ability to readily connect, disconnect and reconfigure optical connections at a convenient tap point regardless of the actual position of the corresponding mid-span access location in the network and without disturbing the remaining connector ports 28. For example, if the downstream end of the tether assembly 20, and in particular furcation legs 26 and connector ports 28, are disposed within a pedestal, vault or hand-hole, a field technician can readily connect, disconnect or reconfigure one or more of the plurality of individual connector ports 28 without disturbing the remaining connector ports. As a result, the remaining connector ports 28 will not be inadvertently damaged.

The foregoing is a description of various embodiments of the invention that are given here by way of example only. Although tether assemblies and fiber optic distribution cables including tether assemblies having a preselected or customized length of tether cable terminating in one or more individual connector ports have been described with reference to preferred embodiments thereof, other embodiments may perform similar functions and/or achieve similar results. Any and all such equivalent embodiments and That which is claimed is:

1. A tether assembly for a fiber optic cable, comprising:
   a tether cable having a first end adapted to be attached to the fiber optic cable and a second end, the tether cable containing a plurality of optical fibers optically connected to a corresponding plurality of optical fibers accessed and terminated from the fiber optic cable;
   a furcation at the second end of the tether cable for separating the optical fibers of the tether cable and transitioning the optical fibers into at least one furcation leg, the furcation leg having a first end attached to the furcation and a second end;
   at least one individual connector port at the second end of the furcation leg, wherein the connector port comprises a threaded receptacle mounted at the end of the at least one furcation leg operable for presenting an optical connector mounted on the end of at least one of the plurality of optical fibers routed to the receptacle through the furcation leg, and operable for receiving a connectorized drop cable.

2. The tether assembly of claim 1, wherein the tether cable is attached to the fiber optic cable at a mid-span access location and the at least one connector port is routed to a desired location in a fiber optic communications network.

3. The tether assembly of claim 1, wherein the at least one connector port is covered by a protective dust cap during shipping and deployment and until the connector port is needed to interconnect the at least one optical fiber of the plurality of optical fibers of the tether cable with an optical fiber of a connectorized drop cable.

4. The tether assembly of claim 1, wherein the tether assembly is factory-prepared and the optical fibers of the tether cable are splice-ready at the first end of the tether cable so that the tether assembly is configured to be optically connected to the fiber optic cable in the field.

5. The tether assembly of claim 1, wherein the tether assembly is factory-prepared and the optical fibers of the tether cable are connectorized at the first end of the tether cable so that the tether assembly is configured to be optically connected to the fiber optic cable in the field.

6. The tether assembly of claim 1, wherein the furcation is secured within a first opening defined by an external wall of a network connection terminal and the at least one connector port is routed to a second opening defined by the external wall from within the network connection terminal.

7. The tether assembly of claim 1, further comprising a pulling member that protects the at least one connector port during shipping and deployment of the tether assembly.

8. The tether assembly of claim 1, wherein at least one of the furcation and the connector port are overmolded on the furcation leg.

9. A tether assembly adapted to be attached to a fiber optic distribution cable at a mid-span access location to interconnect a plurality of optical fibers accessed and terminated from the distribution cable at the mid-span access location to at least one optical fiber of a connectorized fiber optic drop cable, comprising:
   a tether cable containing a plurality of optical fibers and having a first end and a second end;
   a furcation at the second end of the tether cable at which the plurality of optical fibers of the tether cable are separated;
   at least one furcation leg containing at least one of the optical fibers of the tether cable separated by the furcation at the second end of the tether cable, the furcation leg having a first end adjacent the furcation and a second end; and
   at least one individual connector port at the second end of the furcation leg for optically connecting the at least one of the plurality of optical fibers of the tether cable with the at least one optical fiber of the connectorized fiber optic drop cable;
   wherein the connector port comprises a threaded receptacle mounted at the end of the at least one furcation leg operable for presenting an optical connector mounted upon the end of at least one of the plurality of optical fibers routed to the receptacle through the furcation leg and operable for receiving the connectorized drop cable.

10. The tether assembly of claim 9, wherein the at least one connector port comprises a receptacle for receiving a connector mounted upon the end of the at least one of the plurality of optical fibers of the tether cable and a mating connector mounted upon the end of the at least one optical fiber of the connectorized fiber optic drop cable.

11. The tether assembly of claim 9, wherein the at least one furcation leg comprises a plurality of furcation legs each terminating in a corresponding one of the at least one connector ports, the furcation legs having different lengths so that the connector ports are staggered to thereby reduce the outer diameter of the fiber optic distribution cable and the tether assembly.

12. A fiber optic distribution cable assembly, comprising:
   a distribution cable containing a plurality of optical fibers and at least one mid-span access location positioned along the length of the distribution cable, at least one optical fiber of the plurality of optical fibers being accessed and terminated from the distribution cable at the mid-span access location;
   a tether cable containing at least one optical fiber and having a first end adapted to be attached to the distribution cable at the mid-span access location and a second end, the at least one optical fiber being optically connected to the at least one optical fiber accessed and terminated from the distribution cable;
   a furcation at the second end of the tether cable at which the at least one optical fiber of the tether cable is transitioned into at least one furcation leg having a first end adjacent the furcation and a second end; and
   at least one individual connector port at the second end of the furcation leg for providing access to optically connect the at least one optical fiber of the tether cable with at least one optical fiber of a fiber optic drop cable;
   wherein the connector port comprises a threaded receptacle mounted at the end of the at least one furcation leg operable for presenting an optical connector mounted upon the end of at least one of the plurality of optical fibers routed to the receptacle through the furcation leg and operable for receiving the fiber optic drop cable.

13. The fiber optic distribution cable assembly of claim 12, wherein the at least one connector port comprises a receptacle operable for receiving a connector mounted upon the end of the at least one optical fiber of the tether cable and an opposing connector mounted upon the fiber optic drop cable to optically connect the at least one optical fiber of the connectorized fiber optic drop cable with the at least one optical fiber accessed and terminated from the distribution cable.

14. The fiber optic distribution cable assembly of claim 12, wherein the tether cable is factory-prepared and the optical fibers of the tether cable are splice-ready at the first end of the tether cable so that the tether cable is configured to be optically connected to the fiber optic distribution cable at the mid-span access location in the field.

15. The fiber optic distribution cable assembly of claim 12, wherein the tether cable is factory-prepared and the optical fibers of the tether cable are connectorized at the first end of the tether cable so that the tether cable is configured to be optically connected to the fiber optic distribution cable at the mid-span access location in the field.

16. The fiber optic distribution cable assembly of claim 12, wherein at least one of the furcation and the connector port are overmolded on the furcation leg.

17. A method for mitigating a span length measurement difference in a pre-engineered fiber optic communications network employing a fiber optic distribution cable assembly comprising a distribution cable having a plurality of optical fibers and at least one mid-span access location along the length of the distribution cable at which at least one of the plurality of optical fibers is terminated from the distribution cable, the method comprising:

optically connecting a tether assembly to the distribution cable, the tether assembly comprising a tether cable adapted to be attached to the distribution cable at the mid-span access location and containing at least one optical fiber optically connected to the at least one optical fiber terminated from the distribution cable, the tether cable having a first end and a second end terminating in at least one individual connector port for providing access to the at least one optical fiber of the tether cable optically connected to the terminated optical fiber of the distribution cable; and positioning the at least one connector port at a desired location in the fiber optic communications network to compensate for the span length measurement difference;

wherein the connector port comprises a threaded receptacle mounted at the second end of the tether cable.

18. The method of claim 17, wherein the at least one connector port comprises a receptacle operable for receiving a connector mounted upon the end of the at least one optical fiber of the tether cable and an opposing connector mounted upon a fiber optic drop cable to optically connect the at least one optical fiber of the connectorized fiber optic drop cable with the at least one optical fiber terminated from the distribution cable.

* * * * *